United States Patent [19]

Fitch et al.

[11] 3,842,698

[45] Oct. 22, 1974

[54] SLICING MACHINE FOR SLICING A FOOD PRODUCT OR THE LIKE

[76] Inventors: Clifford E. Fitch, 279 Homewood Ct.; Clifford E. Fitch, Jr., 38 W. 23rd St., both of Chicago Heights, Ill. 60411

[22] Filed: Sept. 11, 1973

[21] Appl. No.: 396,293

[52] U.S. Cl............................ 83/88, 83/91, 83/490
[51] Int. Cl........................ B26d 4/24, B26d 7/06
[58] Field of Search....... 83/88, 91, 92, 490, 411 A, 83/86

[56] References Cited
UNITED STATES PATENTS

| | | | |
|---|---|---|---|
| 2,898,722 | 8/1959 | Hensgen | 83/88 X |
| 3,161,215 | 12/1964 | Werder et al. | 83/92 X |
| 3,318,351 | 5/1967 | Werder | 83/92 |
| 3,428,102 | 2/1969 | Knecht et al. | 83/88 |
| 3,515,190 | 6/1970 | Moriuchi | 83/490 X |

*Primary Examiner*—Willie G. Abercrombie

[57] ABSTRACT

A slicing machine for slicing a food product or the like includes a carriage rotatably mounted for rotation in a substantially horizontal plane about a substantially vertical central axis and a plurality of circular knives rotatably carried by the carriage and arranged in a substantially horizontal plane above the carriage and gyrated about the central axis upon rotation of the carriage. Means are provided for rotating the carriage and for rotating the knives as they are gyrated about the central axis by the carriage. A feed chute for the food product is arranged substantially vertically above the plane of the knives and eccentrically of the central axis. Feeding means in the feed chute positively suspends the food product in the feed chute and incrementally lowers the food product each time that a slice is sliced therefrom by the rotating and gyrating knives. Slice collecting means are arranged below the plane of the knives in substantial alignment with the feed chute for collecting the slices of the food product as they are sliced by the rotating and gyrating knives.

21 Claims, 20 Drawing Figures

SLICING MACHINE FOR SLICING A FOOD PRODUCT OR THE LIKE

The principal object of this invention is to provide an improved slicing machine for slicing a food product or the like and collecting the slices thereof in stacked relation or in shingled relation, which is capable of high speed operation, as for example, slicing and collecting up to 600 slices per minute or more, which is capable of selectively regulating the thickness of the slices, which is capable of stacking desired numbers of slices in a stack, which is capable of slicing food products or the like of varying dimensions, which is capable of slicing food products or the like of different compositions and consistencies, as for example, beef, pork, bacon, meat loaf, olive and pimiento loaf, sausage, hard and soft cheese or the like, which is capable of slicing such food products or the like accurately, cleanly and without smearing, which is simple and rugged in construction and foolproof in operation, which may be readily sharpened on the job without dismantling, and which may be readily incorporated in automated food processing and packaging lines or the like.

Briefly, the preferred form of the slicing machine of this invention includes a carriage which is rotatably mounted for rotation in a substantially horizontal plane about a substantially vertical central axis, and a plurality of circular knives rotatably carried by the carriage eccentrically of said central axis and arranged in a substantially horizontal plane above the carriage and which are gyrated about the central axis upon rotation of the carriage. Means are provided for rotating the carriage and for rotating the knives about their axes as they are gyrated about the central axis. A feed chute for the food product or the like is substantially vertically arranged above the plane of the knives and eccentrically of the central axis in alignment with the path of gyration of the knives. Feeding means in the feed chute positively suspend the food product or the like in the feed chute and incrementally lower the food product or the like each time that a slice is sliced therefrom by the rotating and gyrating knives. Slice collecting means below the plane of the knives and in substantial alignment with the feed chute receive and collect slices of the food product as they are sliced by the rotating and gyrating knives.

By reason of the multiple rotating knives on the rotating carriage, maximum slicing capacity is provided for acceptable speeds of rotation of the carriage and the carriage is completely balanced in its rotation to allow for maximum speeds of rotation of the carriage. Since the food product or the like is positively suspended in the feed chute and is incrementally advanced as slices are sliced therefrom, there is no need for a gauge plate as is usually present in slicing machines and smearing or the like of the food product is eliminated. Also, the thickness of the slices of the food product or the like may be readily regulated and controlled by controlling the amount of each incremental advance of the food product or the like as it is being sliced. By adjusting the relative speeds of rotation of the knives and the carriage, the draw speed of the knives with respect to their speed of penetration into the food product or the like may be regulated so that food products or the like of widely different compositions and consistencies may be readily and cleanly sliced. The slices of the food product or the like may be collected in various ways, as for example, in shingle form or stack form or the like and several forms of collecting means are specifically referred to herein.

The slicing machine may also be provided with a plurality of feed chutes and collecting means arranged circumferentially around the central axis for increasing still further the slicing capacity of the machine, if, this be desired. While reference has been made, in connection with the preferred form of this invention, to a substantially vertical central axis, a substantially horizontal planes of rotation of the carriage and knives, some deviation therefrom is contemplated herein, as for example, where for control of the slices of the food product or the like, it may be desirable to tilt somewhat the slicing plane out of the horizontal.

Further objects of this invention reside in the details of the slicing machine and in the cooperative relationships between the component parts thereof.

Other objects of this invention will become apparent to those skilled in the art upon reference to the accompanying specification, claims and drawings in which:

FIG. 2 is a perspective view of a portion of the slicing machine illustrated in FIG. 1 with parts thereof shown in diagrammatic form, FIG. 2 illustrating principally one form of the collecting means utilized for stacking the slices of the food product or the like;

FIG. 15 is a perspective view of another form of the collecting means for stacking the slices as they are sliced from the food product or the like;

FIG. 16 is a vertical sectional view through the collecting means taken substantially along the line 16—16 of FIG. 15;

Figure 1:
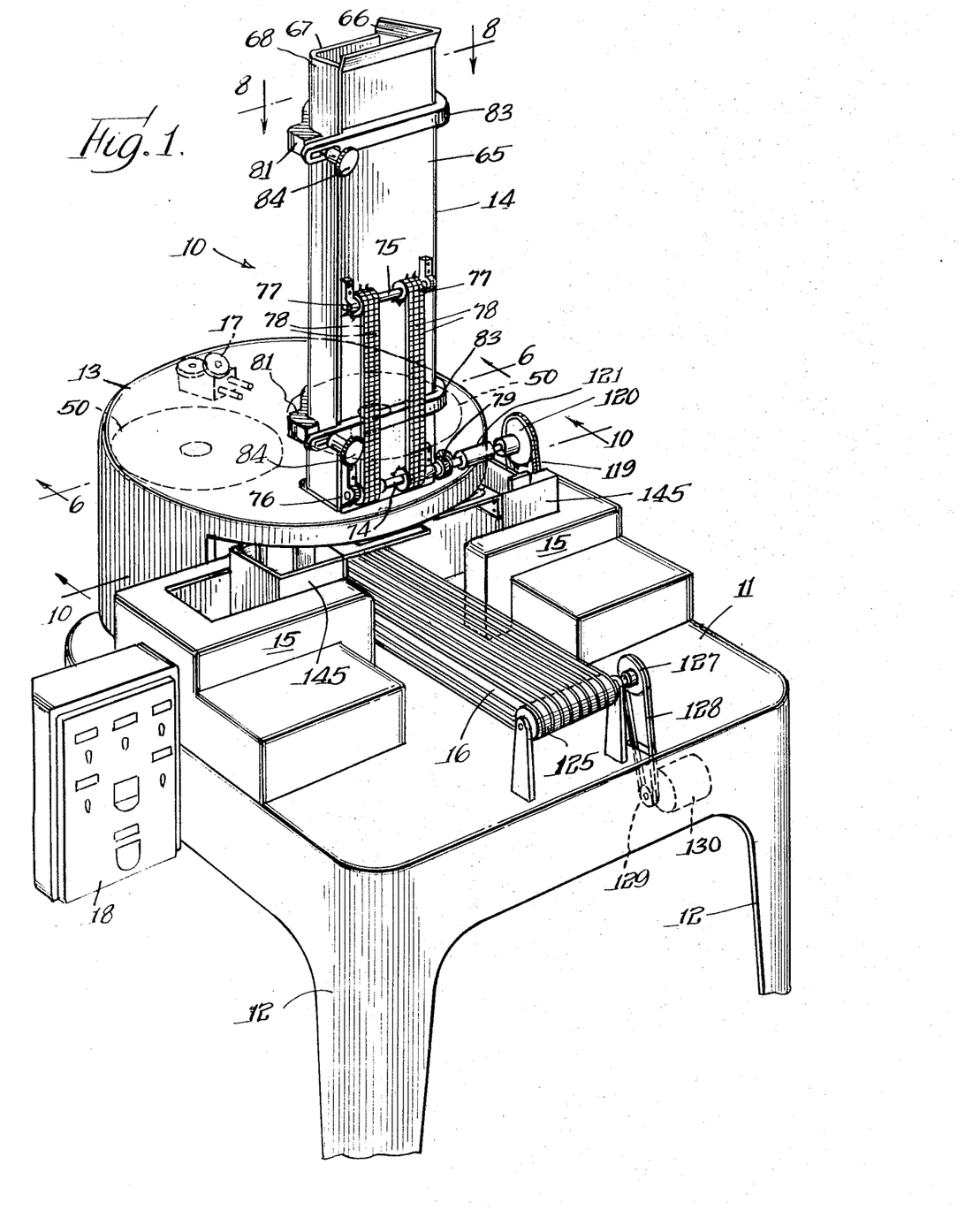
FIG. 1 is a perspective view of a preferred form of the slicing machine of this invention.

Referring first to FIG. 1, a preferred form of the slicing machine of this invention is generally designated at 10. It includes a frame having a table 11 supported by legs 12 and a housing 13 for enclosing the rotating carriage and the rotating and gyrating knives. A feed chute 14 is carried by the housing 13 for feeding the food product or the like to the rotating and gyrating knives to be sliced thereby. The table 11 is provided with housings 15 which contain one form of the collecting means and their controls for stacking the slices as they are sliced by the rotating and gyrating knives. The table 11 also carries a belt conveyor 16 which extends underneath the feed chute 14 below the rotating and gyrating knives for receiving the slices of the food product. The belt conveyor 16 may receive the slices in shingled relation or in stacked relation. The rear of the housing 13 may be provided with a knife sharpener 17 for sharpening the rotating and gyrating knives without the need for dismantling. The frame of the machine may also include a panel box 18 containing suitable controls for the operation of the machine.

Figures 6, 7:
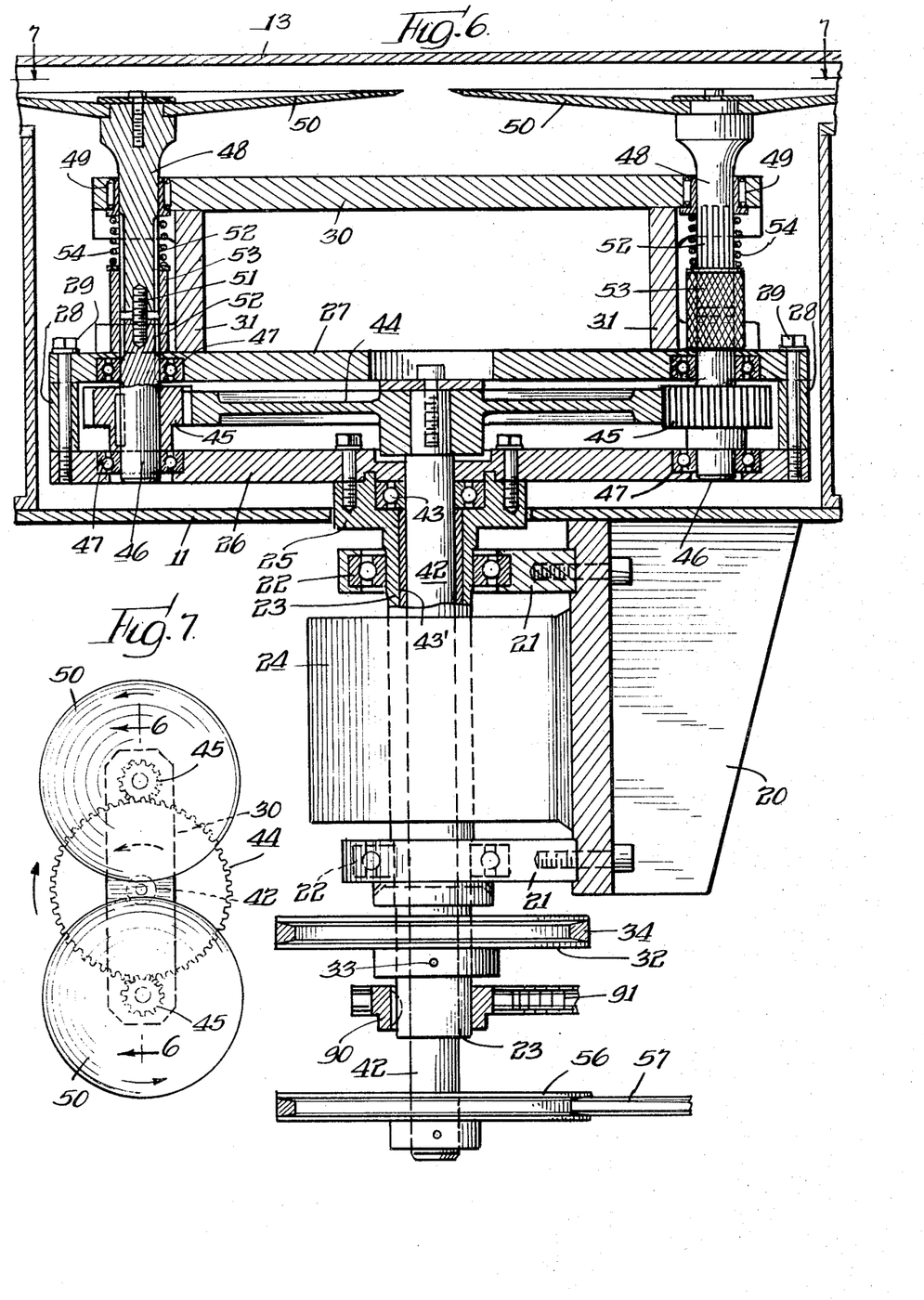
FIG. 6 is a vertical sectional view taken substantially along the lines 6—6 of FIGS. 1 and 7 and illustrating in more detail the construction of the carriage and knives and the manner of their operation.
FIG. 7 is a partial top plan view of the carriage and knives and is taken substantially along the line 7—7 of FIG. 6.

Referring, now, more specifically, to FIG. 6, the table 11 is provided with a downwardly extending bracket 20 which carries a pair of bearing brackets 21 which in turn are provided with ball bearings 22 for rotatably mounting a sleeve 23 for rotation about a central axis. The sleeve 23 is rotated in a counterclockwise direction as viewed from the top of FIG. 6 and a one direction clutch 24 carried by the bracket 20 prevents rotation of the sleeve 23 in the opposite or clockwise direction. The sleeve 23 is provided at its upper end with a flange 25 to which a carriage member 26 is suitably secured for rotation therewith. The carriage, in addition to including the carriage member 26, also includes a carriage member 27, the carriage members 26 and 27 being secured together by spacer sleeves 28 and bolts 29. The carriage also includes an upper carriage member 30 which in turn is suitably secured by brackets 31 to the carriage member 27. Thus, as the sleeve 23 is rotated in a counterclockwise direction the carriage including the carriage members 26, 27 and 30 is also rotated in that direction about the central axis, the counterclockwise direction of the carriage being illustrated by the arrow in FIG. 7.

Figures 3, 4, 5:
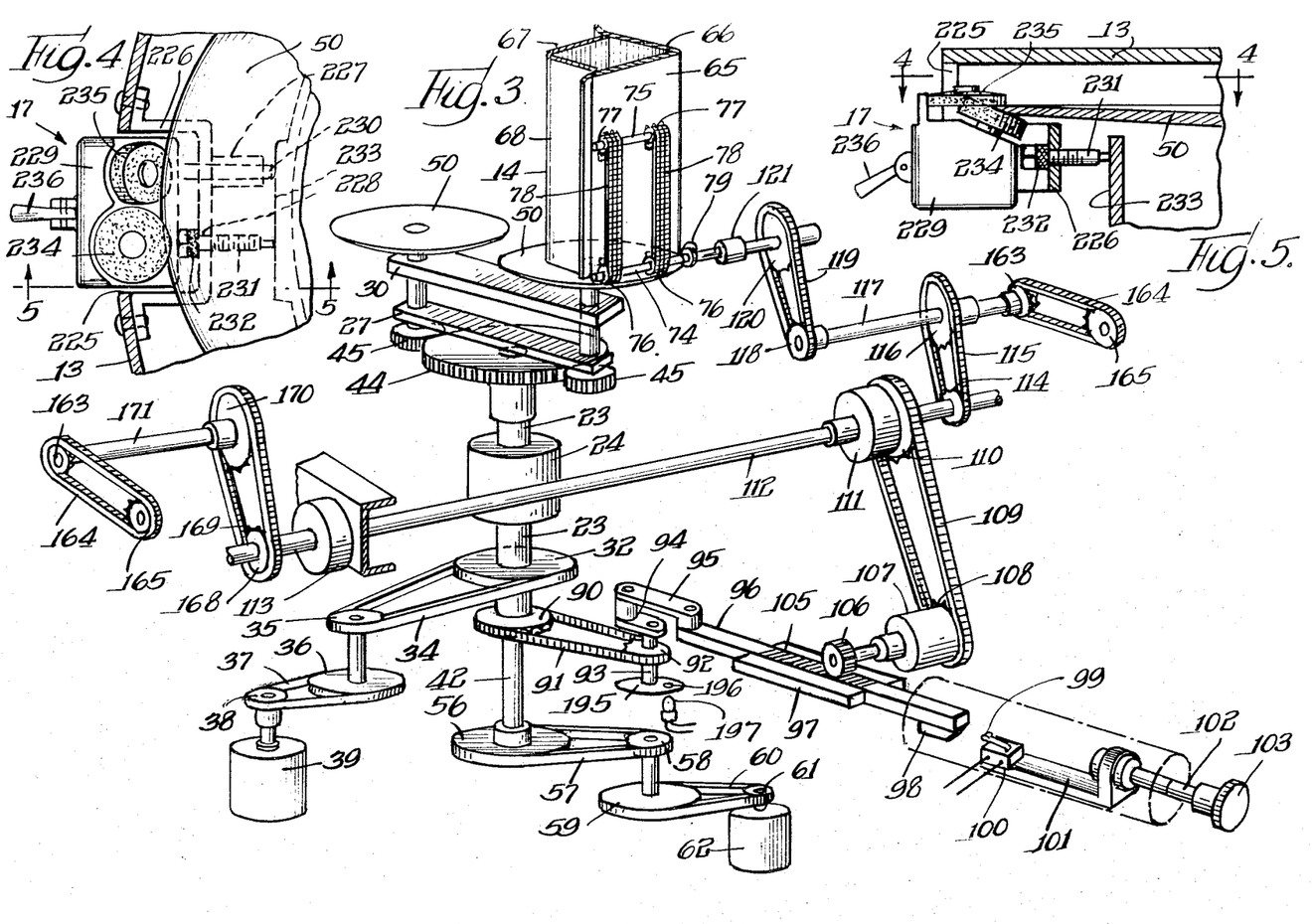
FIG. 3 is a perspective view in diagrammatic form illustrating another portion of the slicing machine shown in FIG. 1, FIG. 3 being directed principally to the manner of operating the carriage and knives and the feeding means for the feed chute.
FIG. 4 is a horizontal sectional view of the knife sharpener appearing at the rear of the machine as illustrated in FIG. 1 and taken substantially along the line 4—4 of FIG. 5.
FIG. 5 is a vertical sectional view of the knife sharpener and is taken substantially along the line 5—5 of FIG. 4.

As shown more clearly in FIGS. 3 and 6, a pulley 32 is secured to the sleeve 23 adjacent its lower end by means of a pin 33 or the like. The pulley 32 and hence the sleeve 23 is driven through a belt 34 by a pulley 35 which in turn is driven through a pulley 36, a belt 37 and a pulley 38 by an electric motor 39. The electric motor 39 may be a variable speed motor for rotating the carriage 26, 27, 30 at desired selected speeds or the connections between the motor 39 and the sleeve 23 may be provided with a variable speed drive for this purpose.

Again, referring to FIGS. 3 and 6, a shaft 42 is rotatably mounted within the sleeve 23 and is supported for such rotation by ball bearings 43 and a sleeve bearing 43'. A gear 44 is secured to the upper end of the shaft 42 and this gear meshes with a pair of gears 45 keyed to a pair of shafts 46. The shafts 46 are rotatably mounted in the carriage members 26 and 27 by ball bearings 47. Another pair of shafts 48 in alignment with the shafts 46 are rotatably mounted in the carriage member 30 by pin bearings 49. Circular knives 50 are secured to the upper ends of the shafts 48. The shafts 48 are adjustably secured to the shafts 46 by screws 51 so that as the shafts 48 are rotated with respect to the shafts 46 the knives 50 may be raised and lowered with respect to the carriage. The shafts 46 and 48 are externally provided with splines 52 in which splined sleeves 53 are adapted to slide. The sleeves 53 when engaging the splines on the shafts 46 and 48 lock the shafts together against relative rotation. Springs 54 urge the sleeves 53 downwardly into locking position but allow the sleeves to be raised for adjustment purposes. This spline connection between the shafts 46 and 48 permits accurate positioning of the height of the knives 50 with respect to the carriage and at the same time provides for positive drive of the knives 50.

As the carriage is rotated in a counterclockwise direction, as illustrated in FIG. 7, and assuming that the gear 44 is stationary the gears 45 roll around the gear 44 to impart rotation to the knives 50 in a counterclockwise direction as illustrated by the arrows in FIG. 7. Thus, as the knives 50 are gyrated about the central axis, they are also rotated about their individual axes. Assuming that the diameter of the gear 44 is four times that of the gears 45, the knives 50 will make four plus one revolutions about their own axes as the carriage 30 is rotated once about the central axis. To obtain desired speeds of rotation of the knives 50 with respect to the carriage 30 other gear ratios between the gear 44 and the gears 45 may be utilized. Also to change the speeds of rotation of the knives 50 with respect to the speed of rotation of the carriage 30 the gear 44 may be rotated. As the gear 44 is rotated in the counterclockwise direction, the speeds of rotation of the knives 50 will be decreased with respect to the speed of rotation of the carriage 30 and, conversely, as the gear 44 is rotated in a clockwise direction, as indicated by the arrow in FIG. 7, the speeds of rotation of the knives 50 may be increased with respect to the speed of rotation of the carriage 30.

To provide variable adjustment of the speeds of rotation of the knives 50 with respect to the speed of rotation of the carriage 30, the lower end of the shaft 42 has a pulley 56 suitably secured thereto and, as illustrated in FIG. 3, the pulley 56 is driven through a belt 57 by a pulley 58 which in turn is driven through a pulley 59, a belt 60 and a pulley 61 by an electric motor 62. By operating the electric motor 62 in one direction or the other and at desired selected speeds, the speeds of rotation of the knives 50 with respect to the speed of rotation of the carriage 30 may be adjusted at will. Instead of utilizing a variable speed motor 62, the motor may rotate the shaft 42 in the desired direction and at desired speeds by a suitable variable speed drive mechanism. By reason of this arrangement the draw speed of the knives 50 with respect to their speed of penetration into the food product or the like may be regulated so that food products or the like of widely different compositions and consistencies may be readily and cleanly sliced, as for example, beef, pork, bacon, meat loaf, olive and pimiento loaf, sausage, hard and soft cheese or the like.

Figure 8:
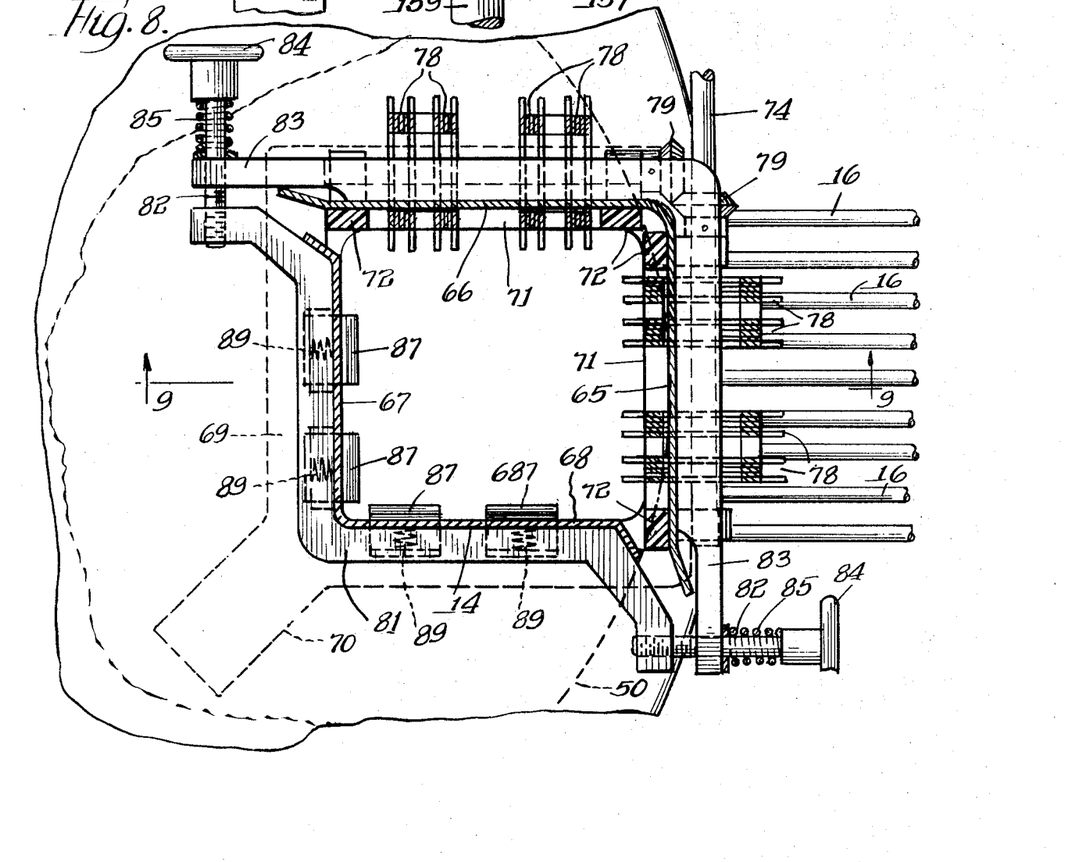
FIG. 8 is a horizontal sectional view through the feed chute and is taken substantially along the line 8—8 of FIG. 1.
Figure 9:
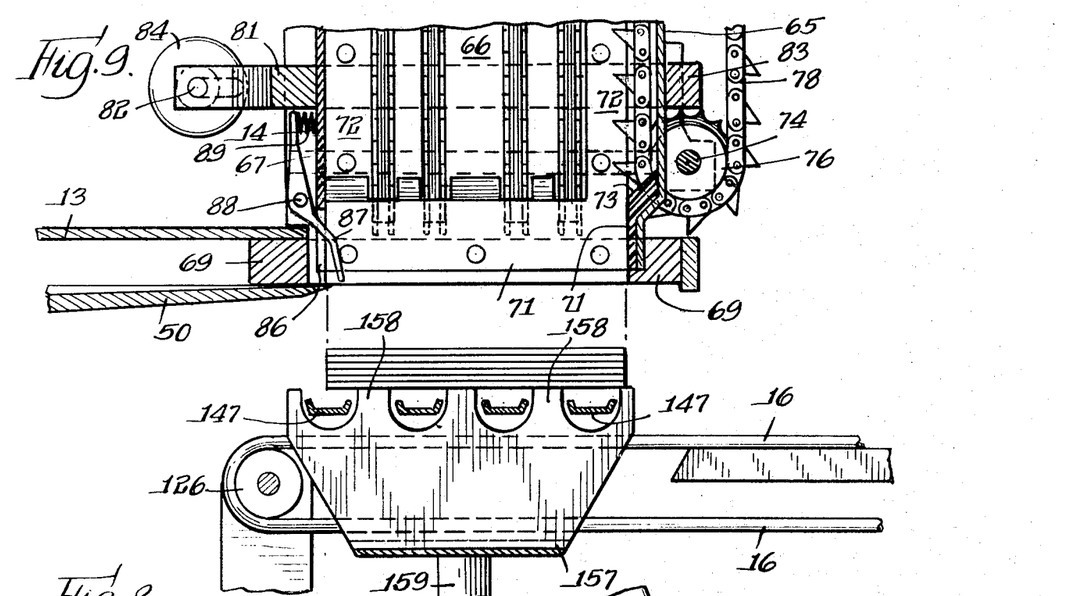
FIG. 9 is a vertical sectional view through the feed chute taken substantially along the line 9—9 of FIG. 8.
Figure 10:
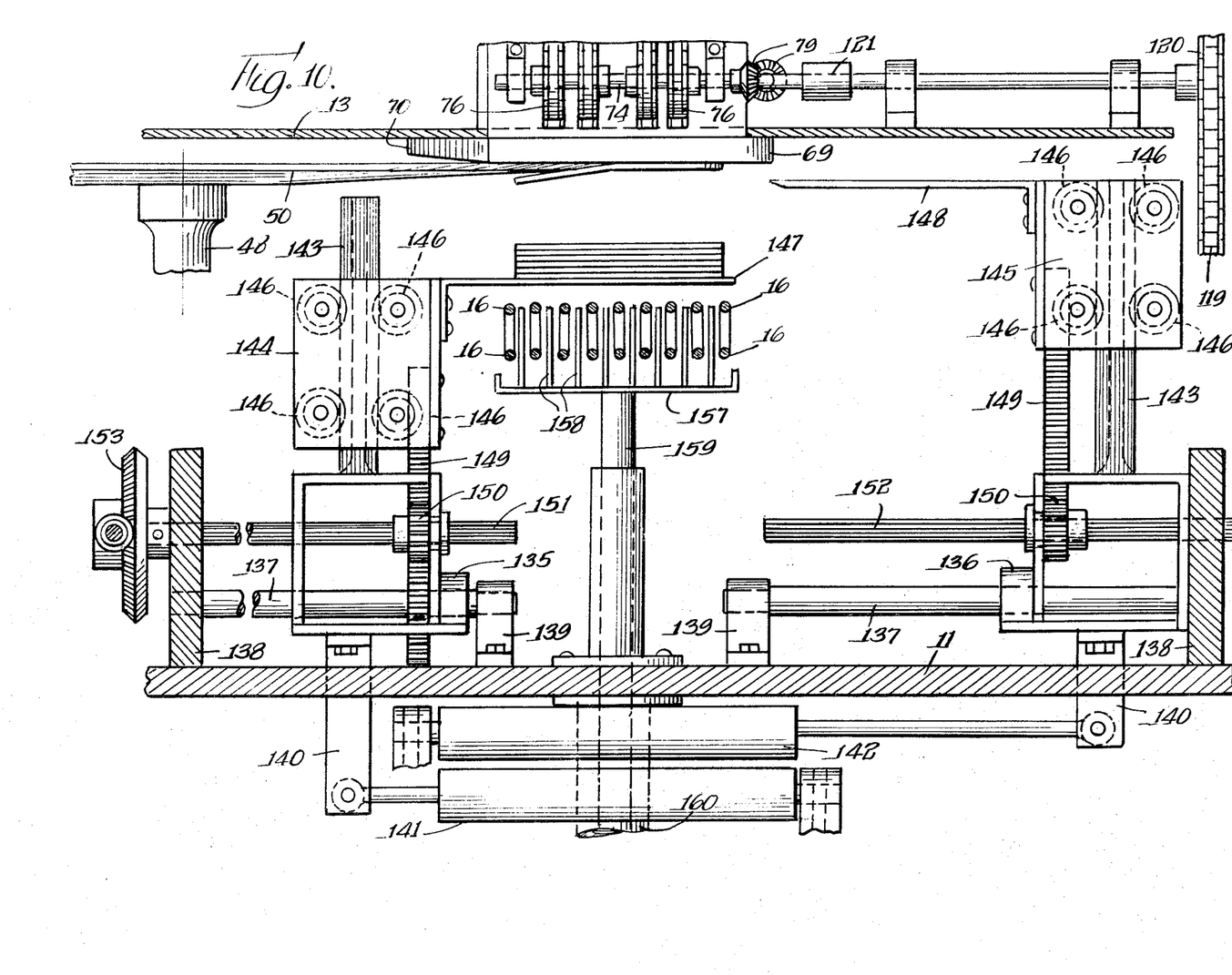
FIG. 10 is a side elevational view partly in section illustrating the form of the collecting means shown in FIG. 1, FIG. 10 being taken substantially along the line 10—10 of FIG. 1.

Referring now more particularly to FIGS. 1, 8 and 9, the feed chute 14 is arranged substantially vertically above the path of gyration of the rotating and gyrating knives 50. It includes a pair of adjacent sides 65 and 66 which are fixedly mounted and which are traversed last by the rotating and gyrating knives, and another pair of adjacent sides 67 and 68 which are adjustably mounted and which are traversed first by the rotating and gyrating knives 50. The lower ends of the adjacent sides 65 and 66 are secured to a plate 69 carried by the frame and having a central opening therethrough. This plate 69 may be provided with a tapered blade guide piece as shown in FIGS. 8 and 10 to prevent a knife 50 from striking a side of the plate 69. Normally the knives 50 are so arranged as to be close to but not to engage the plate 69. The bottoms of the adjacent sides 65 and 66 of the feed chute are provided with inserts 71 having a tapered upper edge 73 and strips 72 extend upwardly from the inserts 71 for substantially the entire length of the adjacent sides 65 and 66. The strips 72 and the inserts 71 operate to guide the food product as it is incrementally lowered in the feed chute. The adjacent sides 65 and 66 of the feed chute have spaced apart horizontal shafts 74 and 75 suitably mounted for rotation thereon. The shafts 74 carry a plurality of sprocket wheels 76 and the shafts 75 carry a plurality of sprocket wheels 77. Chains 78 course the sprocket wheels 76 and 77, the chains 78 extending inwardly into the feed chute through suitable slots in the adjacent sides 65 and 66. The chains 78 are provided with teeth which engage the food product in the feed chute for positively suspending the food product in the feed chute. The lower shafts 74 are connected together by bevel gears 79 for simultaneous rotation, the shafts 74 being incrementally advanced for incrementally advancing the chains 78 for incrementally lowering the positively suspended food product in the feed chute 14. If desired, belts provided with outwardly facing teeth or cogs may be utilized instead of the chains 78, the belts probably being more easily cleaned and sterilized than the chains.

The other adjacent sides 67 and 68 of the feed chute are carried by a pair of brackets 81 which in turn carry screws 82 extending through slots in a pair of brackets 83 fixed to the stationary adjacent sides 65 and 66. The screws 82 may be adjustably positioned in the brackets 81 by knobs 84 and springs 85 interposed between the knobs 84 and the stationary brackets 83 operate resiliently to urge the adjacent sides 67 and 68 toward the adjacent sides 65 and 66 of the feed chute. Thus, the food product within the feed chute is resiliently urged into engagement with the teeth on the chains 78 and with the guide strips 72 and the inserts 71. As the food product is being incrementally lowered in the feed chute by the incremental movement of the chains 78, the tapered edge 73 on the inserts 71 operate to firmly guide the food product so that the teeth on the chains 78 may be readily withdrawn from the food product as they course around the sprockets 76. The inserts 71 also operate to firmly confine the food product in the plate 69 as slices are being sliced from the food product by the gyrating and rotating knives 50. By adjusting the knobs 84 the dimensions of the feed chute 14 may be varied to accommodate food products or the like of varying dimensions.

The lower ends of the sides 67 and 68 are each provided with a plurality of slots 86 through which fingers 87 project. The fingers 87 are pivoted to the sides 67 and 68 at 88 and the upper ends of the fingers 87 are resiliently urged outwardly by springs 89 to resiliently urge the lower ends of the fingers 87 inwardly. When a food product, such as a sausage or the like having ends of reduced cross section, is being sliced, the lower ends of the fingers 87 are retracted into the slots 86 against the action of the springs 89 by the food product. However, when the sausage or the like is substantially completely sliced, so that the remaining end of the sausage having reduced cross-sectional dimensions is adjacent the fingers 87, the fingers 87 extend inwardly from the slots 86 and resiliently urge the remaining end of the sausage against the inserts 71 of the stationary sides 65 and 66 and retain the remaining end of the sausage in the feed chute to be sliced by the knives as it is incrementally lowered. As a result, the remaining end of the sausage or the like is sliced by the knives and is prevented from falling unsliced from the feed chute.

Referring, now, more particularly to FIGS. 3 and 6, the lower end of the sleeve 23 which rotates the carriage has a sprocket wheel 90 suitably keyed thereto, the sprocket wheel being connected by a chain 91 to another sprocket wheel 92 carried by a shaft 93. Since the slicing machine specifically illustrated herein contains two knives 50 carried by the carriage the diameter of the sprocket wheel 92 is made one-half of the diameter of the sprocket wheel 90 so that the sprocket wheel 92 and the shaft 93 make two revolutions for each revolution of the sprocket wheel 90 and the carriage. If more than two knives 50 are utilized, for example, three knives 50, then the ratio of the diameters of the sprocket wheels 90 and 92 would be 3:1. In other words, the shaft 93 makes one complete revolution each time that a knife 50 is gyrated past the feed chute 14. The shaft 93 carries a crank arm 94 which is connected by a link 95 to a rack bar 96 slidably mounted in a guideway 97. The outer end of the rack bar 96 is provided with a cam 98 for engaging a lever 99 of a switch 100 for closing the switch each time that the rack bar 96 is advanced by the crank 94. The switch 100 is carried by a slide 101 which is adjustably positioned by a screw 102 having a knob 102. Thus, by manipulating the knob 103 the position of the switch 100 may be adjusted so that it may be closed earlier or later during each reciprocating motion of the rack bar 96.

The rack bar 96 is provided with teeth 105 for oscillating a gear 106 which is connected by a one way clutch to a sprocket wheel 108. Thus, each time that the rack bar 96 is advanced by the crank 94 the sprocket wheel 108 is advanced and on the return movement of the rack bar 96 the sprocket wheel 108 remains stationary. The sprocket wheel 108 is connected by a chain 109 to a sprocket wheel 110 rotatably mounted on a shaft 112. The sprocket wheel 110 is adapted to be connected to the shaft 112 through an electrical feed clutch 111. When the electrical feed clutch is energized, the sprocket wheel 110 is connected to the shaft 112 and when it is deenergized, it is disconnected therefrom. The shaft 112 is also provided with an electrically operated brake 113 which is energized to prevent rotation of the shaft 112 when the feed clutch 111 is de-energized. The feed clutch 111 and the brake 113 are controlled by the switch 100. Thus, by adjusting the position of the switch 100 the amount of incremental advance of the shaft 112 by the rack bar 96 may be adjusted.

The shaft 112 operates a sprocket wheel 114 which is connected by a chain 115 to a sprocket wheel 116 on a shaft 117. The shaft 117 also carries a sprocket wheel 118 which is connected by a chain 119 to a sprocket wheel 120 which in turn is suitably coupled by a coupling member 121 to the shafts 74. By reason of these connections between the shaft 112 and the shafts 74 the chains 78 in the feed chute are incrementally advanced each time that a knife 50 gyrates past the feed chute and the amount of each such incremental advance is determined by the position of the switch 100 as regulated by the knob 103. As a result, the thickness of the slices sliced from the food product may be accurately controlled and adjusted by merely manipulating the knob 103.

The knives 50 are convex on the bottom and concave on the top so that the cutting edges of the knives are at the highest point. The cutting edges of the knives 50, as shown more clearly in FIG. 9 pass closely adjacent to the plate 69 containing the food product or the like for slicing slices therefrom. The concave top of the knives 50 provide clearance behind the cutting edges thereof so as to provide a clean slice without smearing or the like. As expressed above, the knives 50 are located in a substantially horizontal plane. However, it has been found that if the vertical axes of the knives are tilted backwardly a small amount, as for example, 2° or 3°, the trailing cutting edges of the knives are slightly lower than the advancing cutting edges thereof. This provides some additional clearance for the trailing edges of the knives are slightly lower than the advancing cutting edges thereof. This provides some additional clearance for the trailing edges of the knives so as to further enhance the clean cutting of the slices.

Figure 2:
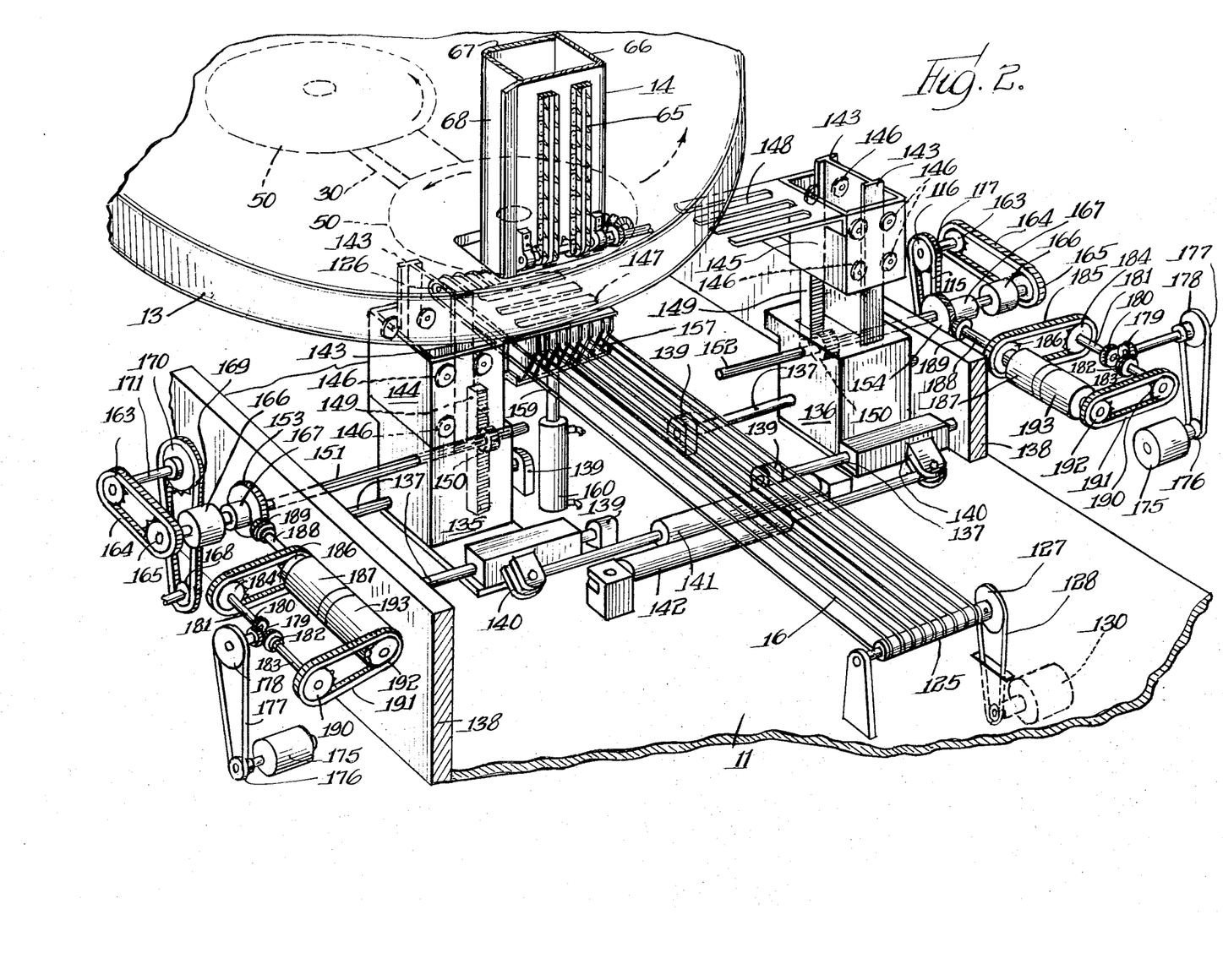

As shown more clearly in FIGS. 1, 2 and 9, the multiple belt conveyor includes a plurality of belts coursing pulleys 125 and 126 which are suitably supported on brackets carried by the table 11. The multiple belt conveyor extends from a point underneath the feed chute 14 outwardly to a point of discharge. The pulleys 125 are driven by a pulley 127 which is connected by a belt 128 to a pulley 129 driven by an electric motor 130. The electric motor 130 may be a variable speed motor which may be regulated for regulating the speed of advance of the multiple belt conveyor 16. In accordance with one aspect of this invention the slices of the food product as they are sliced by the knives 50 may fall directly on the multiple belt conveyor 16 and since the multiple belt conveyor is continuously advancing, the slices of the food product will be arranged thereon in shingled form, the speed of advance of the multiple belt conveyor 16 determining the amount of shingling between the slices.

In accordance with another aspect of this invention the slices of the food product are stacked and then the stacks deposited on the multiple belt conveyor 16 to be conveyed to the point of discharge. One form of such a stacking arrangement is illustrated in FIGS. 2, 9 and 10. Here, a pair of carriers 135 and 136 are arranged on opposite sides of the multiple belt conveyor 16. These carriers are slidably mounted on rods 137 suitably carried by supports 138 and 139 in turn carried by the table 11. The carriers 135 and 136 are provided with arms 140 which are connected respectively to air cylinders 141 and 142 or other appropriate operating means. By supplying air to and exhausting air from the air cylinders 141 and 142 the carriers may be moved inwardly and outwardly, the carrier 135 being shown in an inner position and the carrier 136 being shown in an outer position in FIGS. 1, 2 and 10. Each of the carriers 135 and 136 is provided with upwardly extending tracks 143 for vertically slidably mounting heads 144 and 145 respectively, the heads containing rollers 146 engaging the tracks 143. The head 144 carries an inwardly extending tined fork 147 and the head 145 carries an inwardly extending tined fork 147 and the head 145 carries an inwardly extending tined fork 148. Each of the heads 144 and 145 is provided with a rack bar 149 engaging gears 150 rotatably carried by the carriers 135 and 136, respectively. These gears 150 are splined to a spline shaft 151 for the carrier 135 and a spline shaft 152 for the carrier 136. The splined shafts 151 and 152 are journalled in the supports 138 and are provided respectively with bevel gears 153 and 154. By rotating the splined shafts 151 and 152 the heads 144 and 145 may be raised and lowered. In FIG. 10 the head 144 is shown in a lowered position while the head 145 is shown in an upper position. When the tined forks 147 and 148 are moved inwardly, they underlie the feed chute 14 and overlie the multiple belt conveyor 16.

Arranged below the multiple belt conveyor 16 is a transfer member 157 having a plurality of projections 158 extending upwardly between the belts of the multiple belt conveyor 16. These projections 158 are also adapted to extend upwardly between the tines of the forks 147 and 148. The transfer member 157 is carried by a plunger 159 which is operated by an air cylinder 160 or the like. When air is supplied to the air cylinder 160, the transfer member 157 is raised and when air is exhausted therefrom, it is lowered. In FIG. 10 it is shown in its lowered position.

The manner in which the carriers 135 and 136 are moved inwardly and outwardly and the manner in which the heads 144 and 145 are raised are illustrated in more detail in FIG. 2 and also in FIG. 3. The shaft 117 which incrementally advances the chains 78 in the feed chute carries a sprocket wheel 163 which is connected by a chain 164 to a sprocket wheel 165 which is connected through an electrical index clutch 166 and an electrical brake 167 to the beveled gear 154 which operates the spline shaft 152. The shaft 112 which is incrementally advanced carries a sprocket wheel 168 which is connected by a chain 169 to a sprocket wheel 170 on a shaft 171, the shaft 171 carrying a sprocket wheel 163 which is connected by a chain 164 to a sprocket wheel 165. The sprocket wheel 165 is connected through an electrically operated index clutch 166 and an electrically operated brake 167 to the bevel gear 153 which operates the splined shaft for the carrier 135. In connection with the operation of the spline shaft 151 of the carrier 135 there is also provided an electric motor 175 having a pulley 176 connected by a belt 177 to a pulley 178 which in turn drives a bevel gear 179. Bevel gears 180 and 182 carried respectively by shafts 181 and 183 mesh with the bevel gear 179 for rotating sprocket wheels 184 and 190, respectively, in opposite directions. The sprocket wheel 184 is connected by a chain 185 to a sprocket wheel 186 which is adapted to be connected through an electrically operated clutch 187 to a shaft 188 having a bevel gear 189 meshing with the bevel gear 153. In a like manner the sprocket wheel 190 is connected by a chain 191 to a sprocket wheel 192 which is also adapted to be connected by an electrically operated clutch 193 to the shaft 188. When the clutches 187 and 193 are both de-energized, the shaft 188 runs freely and when the electrical clutch 166 is energized and the electrical brake 153 is de-energized, the splined shaft 151 is incrementally advanced for lowering the head 144 for an amount at least equal to the thickness of the slices being sliced from the food product or the like. When the clutches 187, 193 and 166 are de-energized and the brake 167 is energized, the splined shaft 151 is locked in position and there is no raising or lowering of the head 144. When the electrical brake 67 is de-energized and the electrical clutch 166 is de-energized and when the electrical clutch 187 is energized, the shaft 188 is rotated to rapidly rotate the splined shaft 151 and rapidly move the head 144 upwardly. Likewise, when the electrical brake 167 is de-energized and the clutch 166 is de-energized and when the electrical clutch 193 is energized, the shaft 188 and the splined shaft 151 are rapidly operated in the opposite direction to rapidly lower the head 144. Thus, the head 144 may be rapidly raised, incrementally lowered and rapidly lowered by the appropriate energization of the electrically operated clutches 187, 166 and 193 and the electrically operated brake 167. The spline shaft 152 for rapidly raising, incrementally lowering and rapidly lowering the head 145 is the same as that described in connection with the head 144 and a further description of such operation is not considered necessary. Here, like reference characters have been utilized for like parts.

The various electrical clutches 166, 187 and 193, the electrical brakes 167 and the air cylinders 141, 142 and 160 are all times and controlled from the shaft 93 which operates the rack bar 96 as illustrated in FIG. 3. Here the shaft 93, which is rotated once each time that a slice is sliced from the food product or the like carries a disc 195 provided with a hole or slot 196 for allowing light to impinge upon a photocell 197 for each revolution of the shaft 93. This photocell controls a counter for counting the number of slices sliced by the slicing machine, the counter operating appropriate electrical control equipment for performing the sequencing of the apparatus. The counter and the associated electrical equipment may be contained in the panel box 18 illustrated in FIG. 1 and the counter may be adjusted for counting any desired number of slices in connection with the sequencing of the apparatus. The counter controls the three air cylinders 141, 142 and 160, the two electrical index clutches 166, the two electrical brakes 167, the two electrical clutches 187 for rapidly raising the heads 144 and 145 and the two electrical clutches 193 for rapidly lowering the heads 144 and 145.

Figures 11, 12, 13, 14:
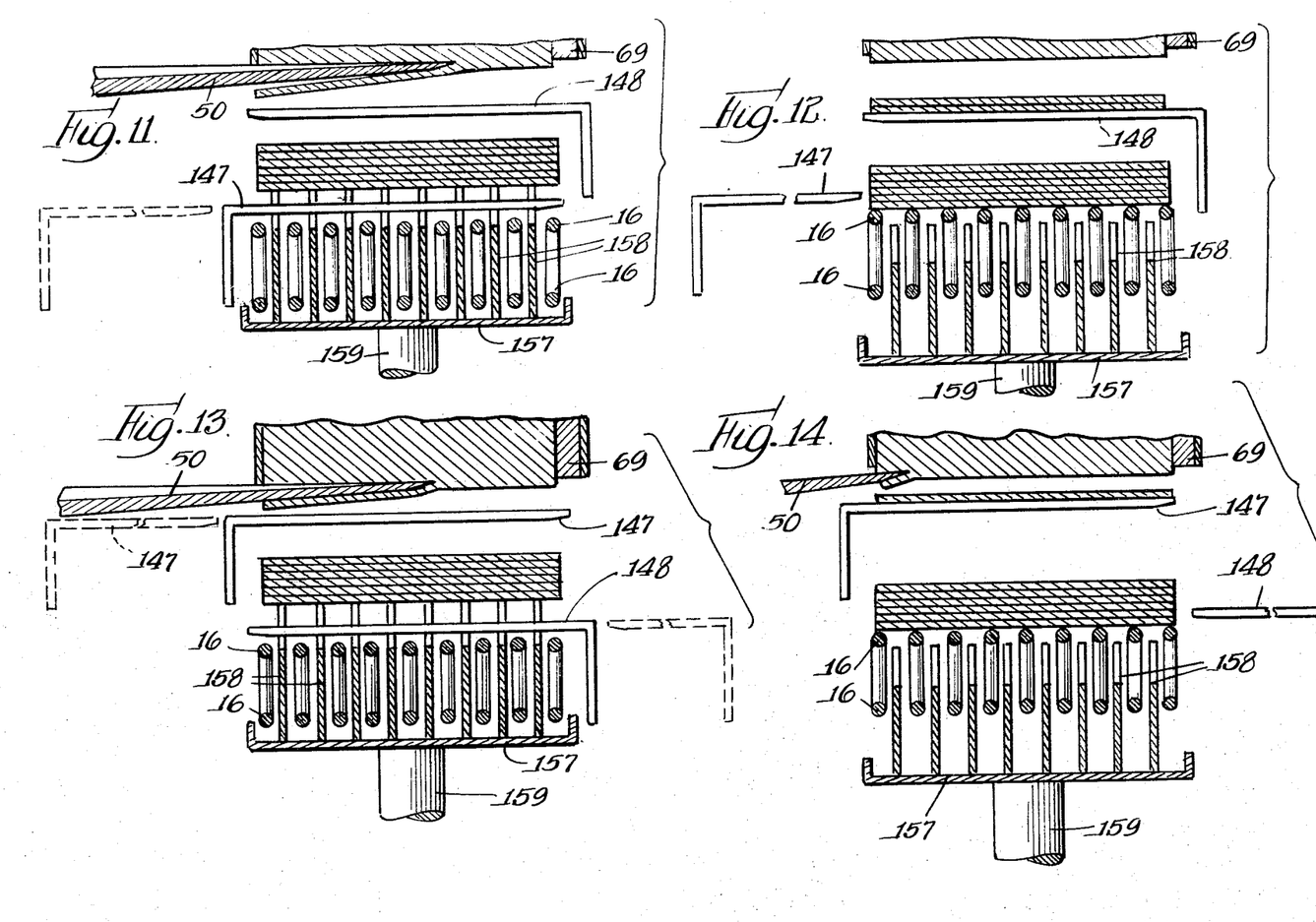
FIGS. 11, 12, 13 and 14 are diagrammatic views illustrating the sequences of operation of the collecting means shown in FIG. 10.

The sequence of operation of the stacking mechanism is diagrammatically set forth in FIGS. 11 to 14. In FIG. 11 the requisite number of slices for the stack as determined by the counter has been sliced, the fork 148 has been raised and moved inwardly to catch the next slice, the fork 147 has been rapidly lowered, and the transfer member 157 has been raised to lift the stack of slices from the lowered fork 147. At this point the fork 147 is then retracted to the broken line position in FIG. 11 and the counter is counting the slices being sliced. After the fork 147 has been retracted, the transfer member 157 is lowered to deposit the stack of slices on the multiple belt conveyor 16 to be conveyed away to the point of discharge as illustrated in FIG. 12. At the same time the slices being sliced are being counted and the fork 148 is being incrementally lowered. While the fork 148 is being so incrementally lowered, the fork 147 is rapidly moved upwardly as shown in broken lines in FIG. 13 and at the same time the transfer member 157 is raised. As soon as the proper count has been completed, the raised fork 147 is rapidly moved inwardly as shown in solid lines in FIG. 13 and the fork 148 is rapidly lowered to deposit the stack of slices on the raised transfer member 157. Immediately the fork 148 is retracted as shown in broken lines in FIG. 13 and then the transfer member 157 is lowered to deposit the stack of slices on the multiple belt conveyor 16 to be conveyed away. While this is occurring the fork 147 is receiving slices and is being incrementally lowered. Thus, this alternate operation of the two forks 147 and 148 and the raising and lowering of the transfer member 157 provides for rapid and accurate stacking of the slices and the transfer thereof to the multiple belt conveyor to be conveyed to the discharge point, this all being automatically accomplished by the counter under the control of the photocell 197. The transfer member 157 may be a part of a weighing apparatus for weighing the stack of sliced food product or the like each time that a stack is transferred to the conveyor.

Figures 15, 16:
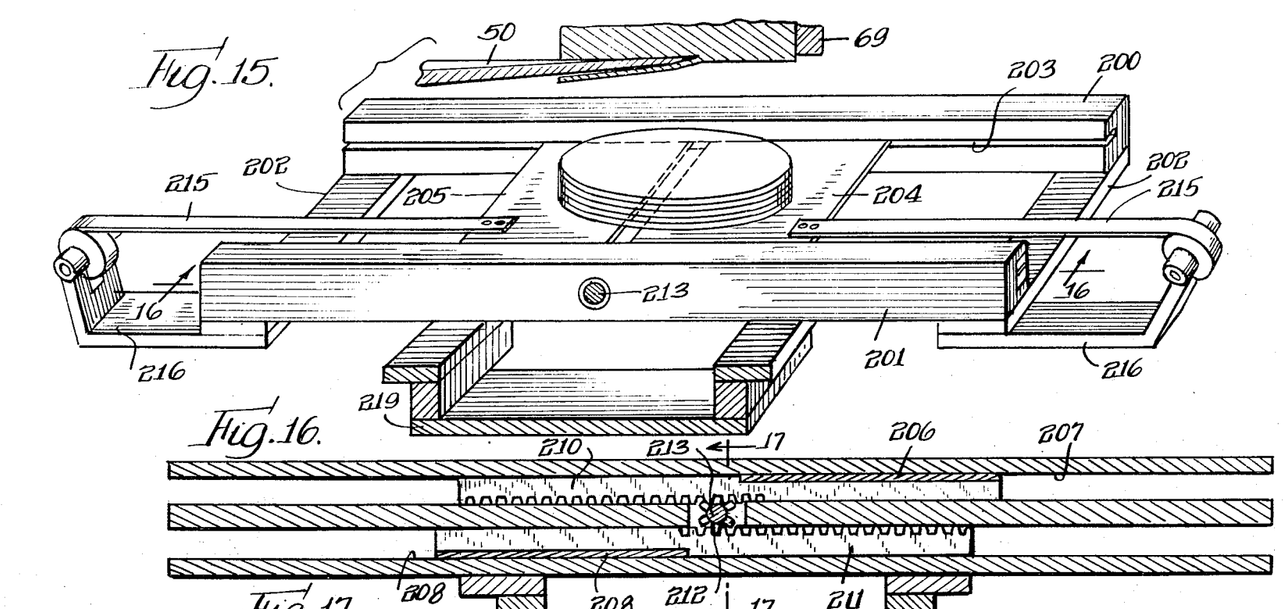
Figure 17:
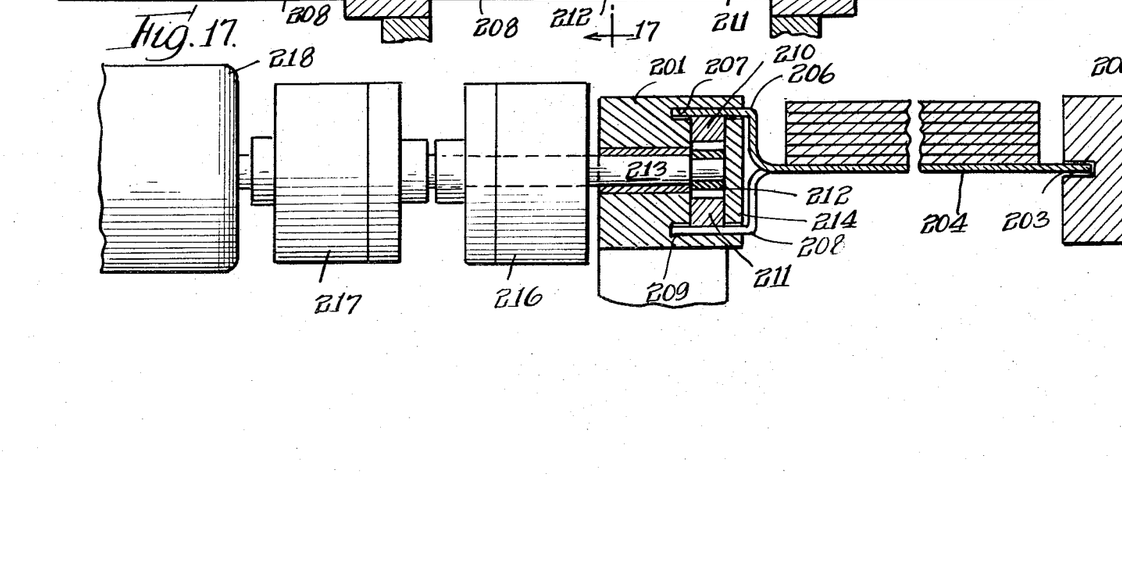
FIG. 17 is a vertical sectional view taken substantially along the line 17—17 of FIG. 16.

Another form of stacking mechanism is illustrated in FIGS. 15 to 17, this stacking mechanism also being under control of the photocell and being arranged below the feed chute 14 and above the multiple belt or other suitable conveyor 17 as discussed above. Here, this form of stacking arrangement includes a pair of bars 200 and 201 connected together by cross bars 202 and suitably mounted in the above described position. The bar 200 has an inwardly facing slot 203 for slidably receiving a pair of panels 204 which are adapted to move from an adjacent closed position as illustrated in FIG. 15 and a separated open position. The panel 204 has an upward extension 206 slidably mounted in an upper slot 207 in the bar 201 and the panel 205 has a downward extension 208 extending into a lower slot 209 in the bar 201, the plates being guided in their movement by the slots 203, 207 and 209. The upper extension 206 of the plate 204 carries a rack bar 210 having downwardly facing teeth. The downwardly extending extension 208 of the panel 205 carries a rack bar 211 having upwardly extending teeth. The two rack bars 210 and 211 mesh with a gear 212 secured to a shaft 213. The rack bars 210 and 211 may be held in place by a suitable guide plate 214. A pair of springs 215 carried by brackets 216 are attached respectively to the panels 204 and 205 and resiliently urge these panels to their separated or open position. The shaft 213 for the gear 212 is connected through a brake 216 and a clutch 217 to an electric motor 218 which is a continuously operating motor. When the brake is released and the clutch is energized, the motor rotates the gear 212 which operates through the rack bars 210 and 211 to move the panels 206 to a closed position as illustrated in FIG. 15. When the panels are in the closed position, the brake 216 is energized to hold them in the closed position and the clutch 217 is de-energized. The closed panels 204 and 205 receive the slices as they are sliced from the food product or the like and after a predetermined number of slices are deposited thereon, the brake 216 is released and the springs 215 immediately separate the panels to deposit the stack of slices on to the multiple belt conveyor 16. Immediately, the clutch 217 is energized to again rapidly close the panels 204 and 205 for catching the next slice sliced by the knives 50 and the panels 204 and 205 are held in the closed position by the brake until the appropriate stack of slices has again been deposited thereon. The bar 201 may be provided with a suitable bracket 219 for supporting the brake 216, clutch 217 and motor 218. The stacking mechanism of FIGS. 15 to 17 is simple in construction and operation and may be wholly satisfactory for stacking slices where the slicing speed of the machine is not too great. However, for extremely rapid slicing the stacking mechanism illustrated in FIG. 10 is preferred.

As expressed above, the housing 13 carries a knife sharpener 17 at the rear thereof as illustrated in FIG. 1 for sharpening the knives 50 in situ without the necessity for any dismantling. The knife sharpener is illustrated in more detail in FIGS. 4 and 5. Here, the rear of the housing 13 is provided with an opening 225 and a bracket 226 is suitably secured in the opening below the knives 50. The bracket 226 is provided with a guide sleeve 227 and a hole 228. The knife sharpener 229 has a pin 230 adapted to be inserted in the sleeve 227 and an adjustable pin 231 adapted to be inserted through the hole 228, the pin 231 being adjusted by a suitable knurled nut 232. The pin 231 is adapted to engage a flat surface 233 on the housing 13 so as to accurately position the knife sharpener with respect to the knife blades 50 to be sharpened. The knife sharpener includes a pair of abrasive wheels 234 and 235 for grinding the cutting edge on the knives 50. The knife sharpener 229 may be locked in place by a suitable toggle lever 236, the position of the sharpener being determined by the pin 231. To sharpen a knife for the carriage is moved to an appropriate position so as to present the circular knife 50 to the wheels 234 and 235. Then the motor 62 is operated to turn the knives 50 in a counterclockwise direction as illustrated by the arrow in FIG. 7. Since the reaction of such counterclockwise turning of the knives 50 is to provide a tendency to turn the carriage 30 in a clockwise direction and since clockwise rotation of the carriage 30 is prevented by the one direction clutch 24, backward motion of the carriage 30 is prevented and forward rotation of the knives 50 is provided. This rotation of the knives, therefore, affords sharpening thereof by the knife sharpener. To sharpen the other knife 50 all that is necessary is to advance the carriage 30 to the appropriate position and repeat the above operation.

Since the top surface of the knives are concave and the bottom surfaces convex, continued sharpening of the knives would have a tendency to lower the cutting edges thereof and this is the reason for the vertical adjustment of the shafts 48 with respect to the shafts 46 as described above. Thus, the cutting edges of the knives may be maintained in proper position regardless of the amount of sharpening given to the knives. When the sharpening operation is completed, the sharpener 17 is removed and the opening 225 may be covered with a suitable closure plate to prevent possible accident.

Figure 18:
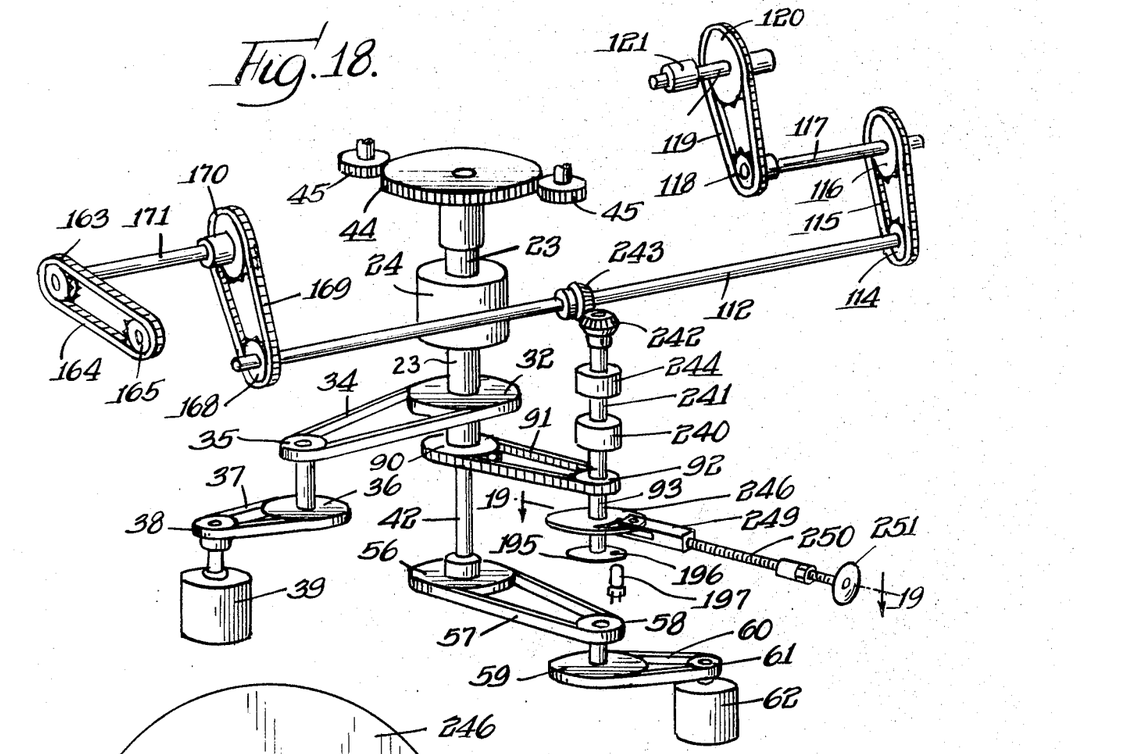
FIG. 18 is a perspective view in diagrammatic form of a portion of the slicing machine as illustrated in FIG. 3 but showing another operating means for operating the feeding means for the feed chute.
Figure 19:
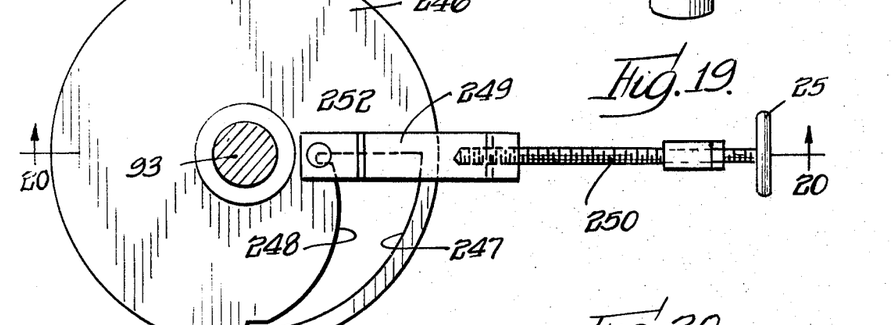
FIG. 19 is a plan view of a portion of the operating means viewed substantially along the line 19—19 of FIG. 68.
Figure 20:
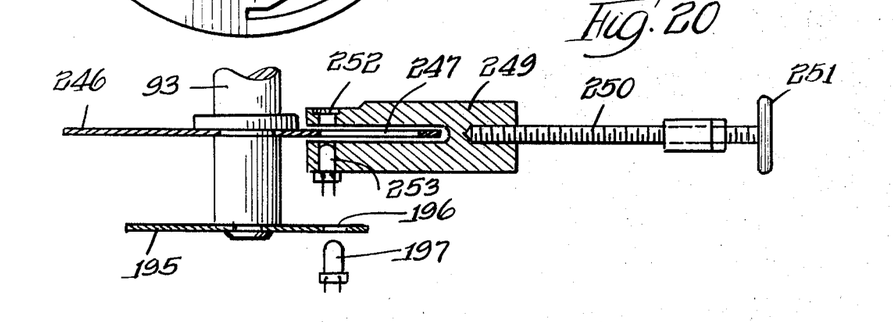
FIG. 20 is a sectional view of the portion of operating means illustrated in FIG. 19 and taken substantially along the line 20—20 of FIG. 19.

FIGS. 18, 18 and 20 disclose an operating means for the feeding means for the chute and for the stacking means which is somewhat different from that illustrated in FIG. 3. FIG. 18 is very much like FIG. 3 and like reference characters have been utilized for like parts. In FIG. 3 a reciprocating rack 96 and a switch 100 are utilized for incrementally advancing the shaft 112. in FIG. 18, the shaft 93 which is rotated at a speed twice as fast as the speed of rotation of the sleeve 23 is provided with an electrical feed clutch 240 for connecting a shaft 241 to the shaft 93 when the electrical feed clutch 240 is energized and for disconnecting the shaft 241 from the shaft 93 when the electrical clutch is de-energized. The shaft 241 is connected by beveled gearing 242 and 243 for rotating the shaft 112. When the electrical feed clutch 240 is energized, the shaft 112 is rotated for operating the feeding means of the feed chute and the stacking mechanism as described above. When the electrical feed clutch 240 is de-energized, no rotation is imparted to the shaft 112 and an electrical brake 244 associated with the shaft 241 operates to prevent rotation of the shaft 112. The electrical brake 244 is energized to prevent rotation of the shaft 241 and, hence, the shaft 112 when the electrical feed clutch 240 is de-energized. Vice versa, when the electrical feed clutch 240 is energized to rotate the shaft 241 and, hence, the shaft 112, the electrical brake 244 is deenergized to allow such rotation.

The electrical feed cluch 240 and the brake 241 are controlled by a control device which includes a disc 246 carried by the shaft 93. This disc 246 is provided with an opening 247 having a curvilinear edge 248. A yoke 249 is radially arranged about the disc 246 and it is radially moved inwardly and outwardly by a screw 250 and a handle 251. This yoke 249 includes a light source 252 and a photocell 253 which cooperate with the aperture 247 in the disc 246. Each time that the disc 246 is rotated the aperture 247 exposes the photocell 253 to the light source 252 and the length of such exposure during each rotation is determined by the curvilinear edge 248 and the position of the yoke 249. In the position shown in FIGS. 19 and 20 the exposure time is a minimum. As the yoke 249 is adjusted radially outwardly the exposure time progressively increases an amount determined by the curvilinear edge 248. Thus the exposure time may be adjusted to any desired value by appropriately positioning the yoke 249. The photocell 253 controls the operation of the electrical feed clutch 240 and the brake 241 for providing the aforementioned incremental feed of the food product in the feed chute. By moving the yoke 249 outwardly each incremental feeding motion of the food product is correspondingly increased. Thus the arrangement of FIGS. 18, 19 and 20 operate in substantially the same way as the arrangement of FIG. 3, and, accordingly, a further description of the operation of the apparatus of FIGS. 18 to 20 is not considered to be necessary.

While for purposes of illustration one basic and preferred form of this invention has been disclosed, other forms thereof may become apparent to those skilled in the art upon reference to this disclosure and, therefore, this invention is to be limited only by the scope of the appended claims.

We claim:

1. A slicing machine for slicing a food product or the like comprising, a carriage rotatably mounted for rotation in a substantially horizontal plane about a substantially vertical central axis, a plurality of circular knives rotatably carried by the carriage eccentrically of said central axis and arranged in a substantially horizontal plane above the carriage and gyrated about said central axis upon rotation of said carriage, means for rotating said carriage for gyrating said knives about said central axis, means for rotating said knives so that they may be rotated about their axes as they are gyrated about said central axis by rotation of said carriage, a feed chute for the food product or the like arranged substantially vertically above the plane of said knives and eccentrically of said central axis in alignment with the path of gyration of said knives, feeding means including means in said feed chute for positively suspending the food product or the like in said feed chute and for incrementally lowering the food product or the like each time that a slice is sliced from the food product or the like by the rotating and gyrating knives, and slice collecting means below the plane of said knives in substantial alignment with said feed chute for receiving and collecting slices of the food product or the like as they are sliced by the rotating and gyrating knives.

2. A slicing machine for slicing a food produce or the like as defined in claim 1 wherein said knives are slightly tilted rearwardly in their path of gyration so that the trailing edges of the knives are slightly lower than the leading edges thereof to provide clearance between the trailing edges of the knives and the food product or the like in the feed chute.

3. A slicing machine for slicing a food product or the like as defined in claim 1, including means for adjusting the relative speeds of rotation of said knives and said carriage for regulating the draw speed of said knives with respect to their speed of penetration into the food product or the like.

4. A slicing machine for slicing a food product or the like as defined in claim 1, wherein said feeding means includes means for adjusting the extent of said incremental lowering of the food product or the like for regulating the thickness of the slices sliced from the food product or the like by the rotating and gyrating knives.

5. A slicing machine for slicing a food product or the like as defined in claim 1, wherein said slice collecting means includes a belt conveyor having a portion thereof in substantial alignment with said feed chute for directly receiving slices of the food product or the like as they are sliced by the rotating and gyrating knives, and means for advancing the belt conveyor at a substantially constant speed for shingling the slices on the belt conveyor.

6. A slicing machine for slicing a food product or the like as defined in claim 1, wherein said slice collecting means includes at least one stacking fork in substantial alignment with said feed chute for receiving and stacking slices of the food product or the like sliced by the rotating and gyrating knives, means for incrementally lowering said at least one stacking fork each time that a slice is sliced from the food product or the like and stacked thereon a distance of at least the thickness of each such slice, and means for adjusting the extent of said incremental lowering of the food product or the like in said feed chute and for adjusting the extent of the incremental lowering of said at least one stacking fork for regulating the thickness of the slices sliced from the food product or the like and for accommodating the stacking of the slices of regulated thickness on the stacking fork.

7. A slicing machine for slicing a food product or the like as defined in claim 1, wherein said slice collecting means includes a multiple belt conveyor having a portion thereof in substantial alignment with said feed chute, at least one tined stacking fork above said multiple belt conveyor adapted to be laterally extended into position between said feed chute and said multiple belt conveyor for receiving and stacking slices of the food product of the like as they are sliced by the rotating and gyrating knives, to be lowered in said extended position, to be laterally retracted from said extended position when lowered, and to be raised when retracted, transfer means below said portion of the multiple belt conveyor having a plurality of upwardly extending projections adapted to be raised upwardly through the multiple belt conveyor and the stacking fork when lowered and to be lowered downwardly below the multiple belt conveyor, and means for sequentially raising said stacking fork, extending said raised stacking fork to receive and stack slices of the food product or the like thereon, lowering the stacking fork as the slices are received and stacked thereon, raising the upwardly extending projections of the transfer means for supporting the stack of slices when the stacking fork is in a lowered position, retracting the lowered stacking fork, and lowering the upwardly extending projections of the transfer means to deposit the stack of slices on the multiple belt conveyor.

8. A slicing machine for slicing a food product or the like as defined in claim 1, wherein said slice collecting means includes a multiple belt conveyor having a portion thereof in substantial alignment with said feed chute, a pair of tined stacking forks above said multiple belt conveyor adapted alternately to be laterally extended from opposite sides of the multiple belt conveyor into position between the said feed chute and said multiple belt conveyor for receiving and stacking slices of the food product or the like as they are sliced by the rotating and gyrating knives, to be lowered in said extended position, to be laterally retracted from said extended position when lowered, and to be raised when retracted, transfer means below said portion of the multiple belt conveyor having a plurality of upwardly extending projections adapted to be raised upwardly through the multiple belt conveyor and the stacking forks when lowered and to be lowered downwardly below the multiple belt conveyor, and means for alternately and sequentially raising said stacking forks, extending said raised stacking forks to receive and stack slices of the food product or the like thereon, lowering the stacking forks as the slices are received and stacked thereon, raising the upwardly extending projections of the transfer means when the stacking forks are in a lowered position, retracting the lowered stacking forks, and lowering the upwardly extending projections of the transfer means to deposit the stacks of slices on the multiple belt conveyor.

9. A slicing machine for slicing a food product or the like as defined in claim 7, wherein said last mentioned means includes means for incrementally lowering said at least one stacking fork each time that a slice is sliced from the food product or the like and stacked thereon a distance of at least the thickness of each such slice, and means for adjusting the extent of said incremental lowering of the food product or the like in said feed chute and for adjusting the extent of the incremental lowering of said at least one stacking fork for regulating the thickness of the slices sliced from the food product or the like and for accommodating the stacking of the slices of regulated thickness on the stacking fork.

10. A slicing machine for slicing a food product or the like as defined in claim 8, wherein said last mentioned means includes means for incrementally lowering said stacking forks each time that a slice is sliced from the food product or the like and stacked thereon a distance of at least the thickness of each such slice, and means for adjusting the extent of said incremental lowering of the food product or the like in said feed chute and for adjusting the extent of the incremental lowering of said stacking forks for regulating the thickness of the slices sliced from the food product or the like and for accommodating the stacking of the slices of regulated thickness on the stacking forks.

11. A slicing machine for slicing a food product or the like as defined in claim 1, wherein said slice collecting means includes a belt conveyor having a portion thereof in substantial alignment with said feed chute, a stacking mechanism above said portion of the belt conveyor and including a pair of platforms adapted to be moved toward each other for receiving and stacking slices of the food product or the like as they are sliced by the rotating and gyrating knives and to be moved away from each other for depositing the stacks of slices of the food product or the like on the belt conveyor, and means responsive to the slicing of a predetermined number of slices of the food product or the like for moving said platforms away from each other to deposit a stack of slices on the belt conveyor and for immediately moving said platforms toward each other for receiving and stacking slices thereon.

12. A slicing machine for slicing a food product or the like as defined in claim 1, wherein said slice collecting means includes a belt conveyor having a portion thereof in substantial alignment with said feed chute, and a stacking mechanism above said portion of the belt conveyor for receiving and stacking slices of the food product or the like as they are sliced by the rotating and gyrating knives and for depositing stacks of such slices on the belt conveyor.

13. A slicing machine for slicing a food product or the like as defined in claim 1, wherein said feed chute is substantially rectangular in cross-section and includes a pair of adjacent fixed sides which are traversed last by the rotating and gyrating knives, a pair of adjacent movable sides which are traversed first by the rotating and gyrating knives, and means for adjustably positioning said pair of adjacent movable sides with respect to said pair of adjacent fixed sides for accommodating different sizes of the food product or the like, and wherein said feeding means includes a plurality of substantially vertically arranged movable belts on said pair of adjacent fixed sides having teeth extending inwardly in the feed chute for engaging the food product or the like to positively suspend and incrementally lower the same in the feed chute.

14. A slicing machine for slicing a food product or the like as defined in claim 1, including a knife sharpener carried by the machine adjacent the plane of the plurality of knives, means for selectively positioning the knives adjacent the knife sharpener and engaging the knife sharpener with them, means for rotating the selectively positioned knives for sharpening the same, and means for preventing rotation of the carriage as the knives are being sharpened.

15. A slicing machine for slicing a food product or the like as defined in claim 1, including means for individually adjustably raising and lowering the knives with respect to the carriage to compensate for changes in position of the cutting edges of the knives occasioned by sharpening the same.

16. A slicing machine for slicing a food product or the like comprising, a rotatably mounted carriage rotatable about a central axis, a plurality of circular knives rotatably carried by the carriage eccentrically of said central axis and gyrated about said central axis upon rotation of said carriage, means for rotating said knives and for rotating said carriage for gyrating the rotating knives, feeding means for positively supporting the food product or the like and for incrementally advancing the food product or the like toward said knives each time that a slice is sliced from the food product or the like by the rotating and gyrating knives, slice collecting means adjacent the rotating and gyrating knives for receiving and collecting slices of the food product or the like as they are sliced by the rotating and gyrating knives, and means for adjusting the extent of said incremental advance of the food product or the like for regulating the thicknesses of the slices sliced therefrom by the rotating and gyrating knives.

17. A slicing machine for slicing a food product or the like as defined in claim 16, including means for adjusting the relative speeds of rotation of said knives and said carriage for regulating the draw speed of said knives with respect to their speed of penetration into the food product or the like.

18. A slicing machine for slicing a food product or the like comprising, a carriage rotatably mounted for rotation in a substantially horizontal plane about a substantially vertical central axis, at least one knife carried by the carriage eccentrically of said central axis and arranged in a substantially horizontal plane above the carriage and gyrated about said central axis upon rotation of the carriage, means for rotating said carriage for gyrating said at least one knife about said central axis, a feed chute for the food product or the like arranged substantially vertically above the plane of said at least one knife and eccentrically of said central axis in alignment with the path of gyration of said at least one knife, feeding means including means in said feed chute for positively suspending the food product or the like in said feed chute and for incrementally lowering the food product or the like by said at least one gyrating knife, slice collecting means below the plane of said at least one knife in substantial alignment with said feed chute for receiving and collecting slices of the food product or the like as they are sliced by said at least one gyrating knife, and means for adjusting the extent of said incremental lowering of the food product or the like for regulating the thickness of the slices sliced from the food product or the like by said at least one gyrating knife.

19. A slicing machine for slicing a food product or the like as defined in claim 18, wherein said slice collecting means includes at least one stacking fork in substantial alignment with said feed chute for receiving and stacking slices of the food product or the like sliced by said at least one gyrating knife, means for incrementally lowering said at least one stacking fork each time that a slice is sliced from the food product or the like and stacked thereon a distance of at least the thickness of each such slice, and means for also adjusting the extent of said incremental lowering of said at least one stacking fork for accommodating the stacking of the slices of regulated thickness of the food product or the like on said at least one stacking fork.

20. A slicing machine for slicing a food product or the like as defined in claim 18, wherein said feed chute is substantially rectangular in cross section and includes a pair of adjacent fixed sides which are traversed last by said at least one gyrating knive, a pair of adjacent movable sides which are traversed first by said at least one gyrating knife, and means for adjustably positioning said pair of adjacent movable sides with respect to said pair of adjacent fixed sides for accommodating different sizes of the food product or the like, and wherein said feeding means includes a plurality of substantially vertically arranged movable belts on said pair of adjacent fixed sides having teeth extending inwardly in the feed chute for engaging the food product or the like to positively suspend and incrementally lower the same in the feed chute.

21. A slicing machine for slicing a food product or the like as defined in claim 18, wherein said at least one knife is rotatably carried by said carriage, means for rotating said at least one knife so that it may be rotated about its axis as it is gyrated about said central axis by rotation of said carriage, and means for adjusting the relative speeds of rotation of said at least one knife and said carriage for regulating the draw speed of said at least one knife with respect to its speed of penetration into the food product or the like.

* * * * *